(12) United States Patent
Johnson et al.

(10) Patent No.: US 10,142,454 B2
(45) Date of Patent: Nov. 27, 2018

(54) METHOD FOR PROVIDING A CUSTOMIZED USER INTERFACE FOR GROUP COMMUNICATION AT A COMMUNICATION DEVICE

(71) Applicant: MOTOROLA SOLUTIONS, INC, Chicago, IL (US)

(72) Inventors: Eric Johnson, Chicago, IL (US); Zhiyi Zhou, Chicago, IL (US); Roberto A. Perez, Miramar, FL (US); Scott Arnold, Etobicoke (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 80 days.

(21) Appl. No.: 15/441,538

(22) Filed: Feb. 24, 2017

(65) Prior Publication Data
US 2018/0248996 A1    Aug. 30, 2018

(51) Int. Cl.
| | | |
|---|---|---|
| *H04B 7/00* | (2006.01) | |
| *H04M 1/725* | (2006.01) | |
| *H04W 4/08* | (2009.01) | |
| *H04W 8/18* | (2009.01) | |

(52) U.S. Cl.
CPC ......... *H04M 1/72522* (2013.01); *H04W 4/08* (2013.01); *H04W 8/186* (2013.01); *H04M 2203/2044* (2013.01); *H04M 2203/256* (2013.01)

(58) Field of Classification Search
CPC .... H04W 4/08; G06F 3/0482; G06F 3/04817; G06F 3/04842; G06F 17/30867; H04L 51/04; H04L 41/22
USPC ......................................... 455/518, 519, 520
See application file for complete search history.

(56) References Cited

U.S. PATENT DOCUMENTS

| | | |
|---|---|---|
| 5,115,501 A | 5/1992 | Kerr |
| 7,293,034 B2 | 11/2007 | Paya et al. |
| 7,353,234 B2 | 4/2008 | Gill et al. |
| 8,185,830 B2 | 5/2012 | Saha et al. |

(Continued)

FOREIGN PATENT DOCUMENTS

WO    2014085443 A1    6/2014

OTHER PUBLICATIONS

The International Search Report and the Written Opinion, corresponding patent application No. PCT/US2018/018154 filed Feb. 14, 2018, dated May 22, 2018, all pages.

*Primary Examiner* — Tu X Nguyen

(57) ABSTRACT

A method for providing a customized user interface for group communication at a communication device is provided. An electronic processor determines a list of communication groups with which a user identifier of the communication device is registered and identifies a communication group type for each communication group in the list based on service capabilities of the respective communication group. The electronic processor assigns a set of communication group types for the user identifier and determines a type of group communication application to be configured at the communication device. The electronic processor then generates user interface elements as a function of the set of communication group types and the type of group communication application and configures the group communication application including the user interface elements at the communication device for supporting group communication.

17 Claims, 10 Drawing Sheets

(56) References Cited

U.S. PATENT DOCUMENTS

| | | |
|---|---|---|
| 8,769,434 B2 | 7/2014 | Hoffman |
| 8,943,055 B2 | 1/2015 | Kimball et al. |
| 9,135,332 B2 | 9/2015 | Bank et al. |
| 2010/0159994 A1 | 6/2010 | Stallings et al. |
| 2011/0149731 A1* | 6/2011 | Gong ................... H04W 4/08 370/235 |
| 2011/0165905 A1 | 7/2011 | Shuman |
| 2013/0152002 A1 | 6/2013 | Menczel et al. |
| 2014/0357226 A1 | 12/2014 | Charugundla |
| 2016/0147382 A1 | 5/2016 | Moon et al. |
| 2016/0165413 A1* | 6/2016 | Bhalla ................... H04W 4/08 455/456.5 |

* cited by examiner

METHOD FOR PROVIDING A CUSTOMIZED USER INTERFACE FOR GROUP COMMUNICATION AT A COMMUNICATION DEVICE

BACKGROUND OF THE INVENTION

Wireless technology has transformed and simplified the way people communicate with each other. Mobile devices often include different messaging and voice communication applications that allow people to communicate with each other in real time as long as they are connected to a communication network. Such applications also allow users to communicate with multiple other users at the same time. Messaging applications are also widely used by public safety users to communicate with each other during emergency situations. Public safety scenario often requires users to communicate with users from other departments or agencies depending on the emergency situation. Such applications allow the user to subscribe to multiple communication groups. The user may select a group provided on the application to initiate group communication. However, it is not necessary that all communication groups associated with a particular user have same communication capabilities, and further some applications may not support certain communication groups. In these cases, the applications may include irrelevant or superfluous user interface elements representing groups that are not necessarily supported by these applications or utilized by the user.

DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
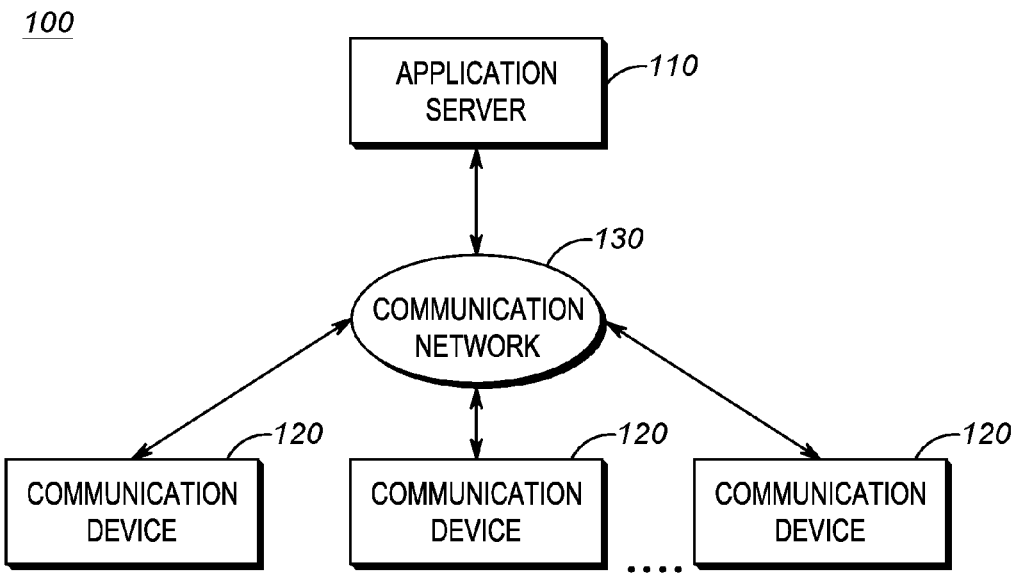
FIG. 1 is a block diagram of a communication system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One exemplary embodiment provides a method for providing a customized user interface for group communication at a communication device. The method includes determining, by an electronic processor, a list of communication groups with which a user identifier of the communication device is registered, identifying, by the electronic processor, a communication group type for each of the communication group in the list, wherein the communication group type identified for each communication group is based at least in part on service capabilities of the respective communication group, assigning, by the electronic processor, a set of communication group types for the user identifier, the set of communication group types including the identified communication group type for each of the communication groups in the list, determining, by the electronic processor, a type of group communication application to be configured at the communication device, and generating, by the electronic processor, one or more user interface elements as a function of the set of communication group types and the type of group communication application. The method further includes configuring the group communication application including the generated user interface elements at the communication device for supporting group communication associated with the user identifier.

Another exemplary embodiment provides an application server that provides a customized user interface for group communication at a communication device. The application server includes a communication interface and an electronic processor coupled to the communication interface. The electronic processor determines a list of communication groups with which a user identifier of a communication device is registered, identifies a communication group type for each of the communication group in the list, wherein the communication group type identified for each communication group is based on service capabilities of the respective communication group, assigns a set of communication group types for the user identifier, the set of communication group types including the identified communication group type for each of the communication groups in the list, determines a type of group communication application to be provisioned in the communication device, generates one or more user interface elements as a function of the set of communication group types and the type of group communication application, and configures, via the communication interface, the group communication application including the generated user interface elements at the communication device for supporting group communication associated with the user identifier.

A further exemplary embodiment provides a communication device. The communication device includes a communication interface, a display, and an electronic processor coupled to the display and communication interface. The electronic processor is configured to provide a group communication application including one or more graphical user interface (GUI) elements via the display for supporting group communication associated with a user identifier via the communication interface. The GUI elements include user interface elements that are generated as a function of a set of communication group types and a type of group communication application. The set of communication group types include communication group type identified for each communication group in a list of communication groups with which the user identifier is registered. The communication group type identified for each communication group is based on service capabilities of the respective communication group.

For ease of description, some or all of the exemplary systems presented herein are illustrated with a single exemplar of each of its component parts. Some examples may not describe or illustrate all components of the systems. Other exemplary embodiments may include more or fewer of each of the illustrated components, may combine some components, or may include additional or alternative components.

FIG. 1 is a block diagram of one exemplary embodiment of a communication system 100. The communication system 100 includes an application server 110 and one or more communication devices 120 communicatively coupled to each other and to the application server 110 via one or more communication networks 130. In accordance with embodiments, the application server 110 is a computing device that configures group communication resources at one or more of the communication devices 120. In the embodiment shown in FIG. 1, the application server 110 is shown as a separate entity that communicates with the communication devices 120 to configure the group communication resources at the communication devices 120. In another embodiment, the functionality of the application server 110 may be implemented at one or more of the communication devices 120 or a server for configuring group communication resources at the communication devices 120.

The group communication resources include one or more group communication applications that are provided to the communication device 120 to enable one or more users of the communication device 120 to perform group communication with a plurality of other communication devices 120 that are affiliated to the same communication group. In accordance with some embodiments, the application server 110, in addition to providing group communication resources, may further provide functionalities of a messaging server that includes storing and providing presence and status update information of the communication devices 120, processing and forwarding communications received from and to the communication devices 120 via communication channels, maintaining the list of communication groups and information about members and associated devices registered to each communication group, maintaining information about the service capabilities of each communication group and group communication application.

In accordance with embodiments, the group communication application provided at the communication device 120 allows the user to communicate simultaneously with other communication devices. As used herein, the term "group" refers to communication groups that include members (i.e. users of communication devices 120) who are affiliated or registered to the group. Each member of the communication group may have a unique user identifier assigned to them for purposes of group communication. In accordance with some embodiment, the same communication device may be associated with multiple users or user identifiers, where each user identifier may be configured with same or different type of group communication applications. The group communication application includes user interface elements that are configured on user's communication devices 120 to allow the user to control different functions for performing group communications. For example, the user can interact with user interface elements (e.g. via a touch or tap input) of the group communication application at the communication device 120 and select one or more groups from a list of configured communication groups and transmit data, voice, and other media forms simultaneously to multiple users within the group without having to individually transmit to each user in the group. In accordance with embodiments, the application server 110 configures and customizes user interface elements associated with the group communication application based at least in part on the type of the group communication application to be provided at the communication device 120 and service capabilities of each communication group in a list of communication groups with which the user of the communication device 120 is registered. In some embodiments, for communication devices operating in push to talk (PTT) communications mode, the groups may be configured as push to talk groups that allow the user to select a talk group to communicate to the members of the talk group. As used herein, the term "PTT" communication represents half-duplex communication, meaning communication can only travel in one direction at any given moment. PTT requires the person speaking to press a button on the communication device 120 while talking and then release it when they are done. In some embodiments, communication devices 120 provide both full-duplex and half-duplex capabilities.

In accordance with some embodiments, the communication device 120 is a portable communication device, such as, for example a two-way radio, a mobile device, laptop, a tablet computer, a wearable communication device, and other computing devices that are configured to communicate over the communication network 130. In the following description, when explaining how a single communication device functions, a reference to communication device 120 is used. It is not necessary, however, that the communication devices 120 shown in FIG. 1 be identical. The communication devices 120 are merely exemplary. In some embodiments, the communication system 100 may include more or fewer portable communication devices than illustrated in FIG. 1. The communication network 130 may be a wired communication network, a wireless communication network, or a combination thereof. All or parts of the communication network 130 may be implemented using various existing networks, for example, a cellular network such as a Long Term Evolution (LTE) network, the Internet, a land mobile radio (LMR) network, a Bluetooth™ network, a wireless local area network (for example, Wi-Fi), a wireless accessory Personal Area Networks (PAN), a Machine-to-machine (M2M) autonomous network, and a public switched telephone network. The communication network 130 may also include future developed networks. In some embodiments, the communication network 130 may also include a combination of the networks mentioned previously herein.

Figure 2:
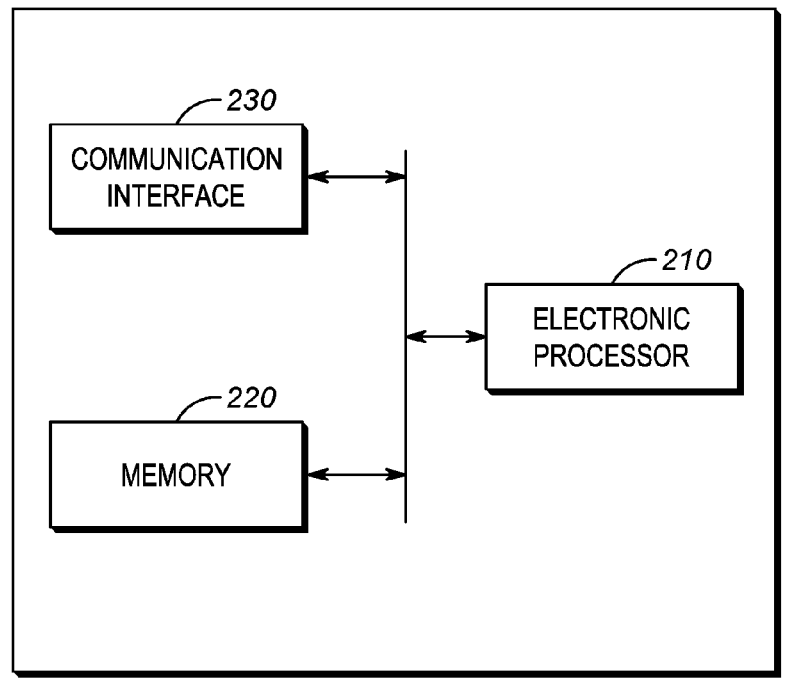
FIG. 2 is a block diagram of an application server, in accordance with some embodiments.

FIG. 2 is a block diagram of an application server 110 in accordance with some embodiments. The application server 110 includes an electronic processor 210, for example, a microprocessor or another electronic device. The electronic processor 210 may include input and output interfaces (not shown) and be electrically connected to a memory 220 and a communication interface 230. In some embodiments, the application server 110 may include fewer or additional components in configurations different from that illustrated in FIG. 2. For example, in some embodiments, the application server 110 also includes a display, speaker, and microphone. In some embodiments, the application server 110 performs additional functionality than the functionality described below.

The memory 220 includes read-only memory (ROM), random-access memory (RAM), other non-transitory computer-readable media, or a combination thereof. The electronic processor 210 is configured to receive instructions and data from the memory 220 and execute, among other things, the instructions. In particular, the electronic processor 210 executes instructions stored in the memory 220 to perform the methods described herein.

The communication interface 230 sends and receives data to and from the communication network 130. The communication interface 230 may include a transceiver for wirelessly communicating with the communication network 130. Alternatively or in addition, the communication interface 230 may include a connector or port for receiving a wired connection, such as an Ethernet cable. The electronic processor 210 may generate electrical signals and may communicate information relating to the electrical signals over the communication network 130 through the communication interface 230, such as for receipt by communication devices 120 operating in the communication system 100. Similarly, the electronic processor 210 may output data received from the communication network 130 through the communication interface 230, through a speaker or a display, or a combination thereof.

In accordance with some embodiments, the memory 220 stores instructions for the application server 110 to provide or update the group communication application including user interface elements at the communication device 120 for supporting group communication. The memory 220 may further maintain and update information (for example, in a database) that identifies a list of communication groups with which each user identifier (i.e. user of the communication device 120) being served by the application server 110 is registered, service capabilities of the communication groups, type of the group communication application to be provided or updated at the communication device 120. In accordance with some embodiments, the electronic processor 210 of the application server 110 generates customized user interface elements (i.e. instructions required for generating or updating user interface elements at the communication device 120) for the group communication application to be provided or updated at the communication device 120. In one embodiment, the electronic processor 210 generates customized user interface elements as a function of the type of the group communication application and a set of communication group types assigned to the user identifier. The set of communication group types is determined by the electronic processor 210 for each user identifier based on the service capabilities of each communication group with which the user identifier of the communication device 120 is registered.

In accordance with some embodiments, the service capabilities of a communication group are determined by the electronic processor 210 based on the media service capabilities of a communication group. For example, the service capabilities of the communication group are determined based on whether the communication group supports or is configured for voice only (V-o) capability, or data only (D-o) capability, or both voice and data (V+D) capability. As used herein, the term "V-o capability" indicates that each member in the communication group is registered to transmit or receive voice communications within the group. Similarly, the term "D-o capability" indicates that each member in the communication group is registered to transmit or receive data communications within the group. The term "V+D capability" indicates that each member in the communication group is registered to transmit or receive both voice communications and data communications within the group. The data communications may take form of text, audio data, video, image, files, maps, applications, location data, hyperlinks, metadata (e.g. overlay, annotations, and sketches), various other data forms, or combination thereof.

In other embodiments, the service capabilities may be derived based on the role, rank, and other identifiers associated with the members registered to a communication group. For example, members of one communication group may be authorized to perform additional actions (such as add new members, request for location or established time of arrival (ETA), exchange forms, applications, maps, documents, and the like) within a communication group, while members of another communication group may not be authorized to perform the additional actions or be authorized to perform only some of the actions. In these cases, the service capabilities or in turn the communication group type of a particular communication group will be determined not only based on the media supported for transmission within the communication group, but also based on additional actions authorized for the members to perform within the communication group. For example, a communication group associated with the detective agency may be authorized to communicate witness statements within the group, while a communication group associated with the fire fighter agency may not be authorized to share such statements within the group. In this case, the group communication application associated with this communication group may in addition include user interface elements (for example, an additional soft key or button) that allow the user to share witness statements with other members in the group. Some communication groups may not have this authorization to share witness statements within the group, and therefore the group communication application of the members corresponding to these groups may not be configured to include user interface elements for supporting communication of witness statements. In another embodiment, a user may be associated with communication groups associated with more than one agency, wherein the same user may be able to communicate or take certain actions in one communication group, but not in the other communication group. Accordingly, the method described herein is not intended to be limited to the examples described herein.

Figure 3:
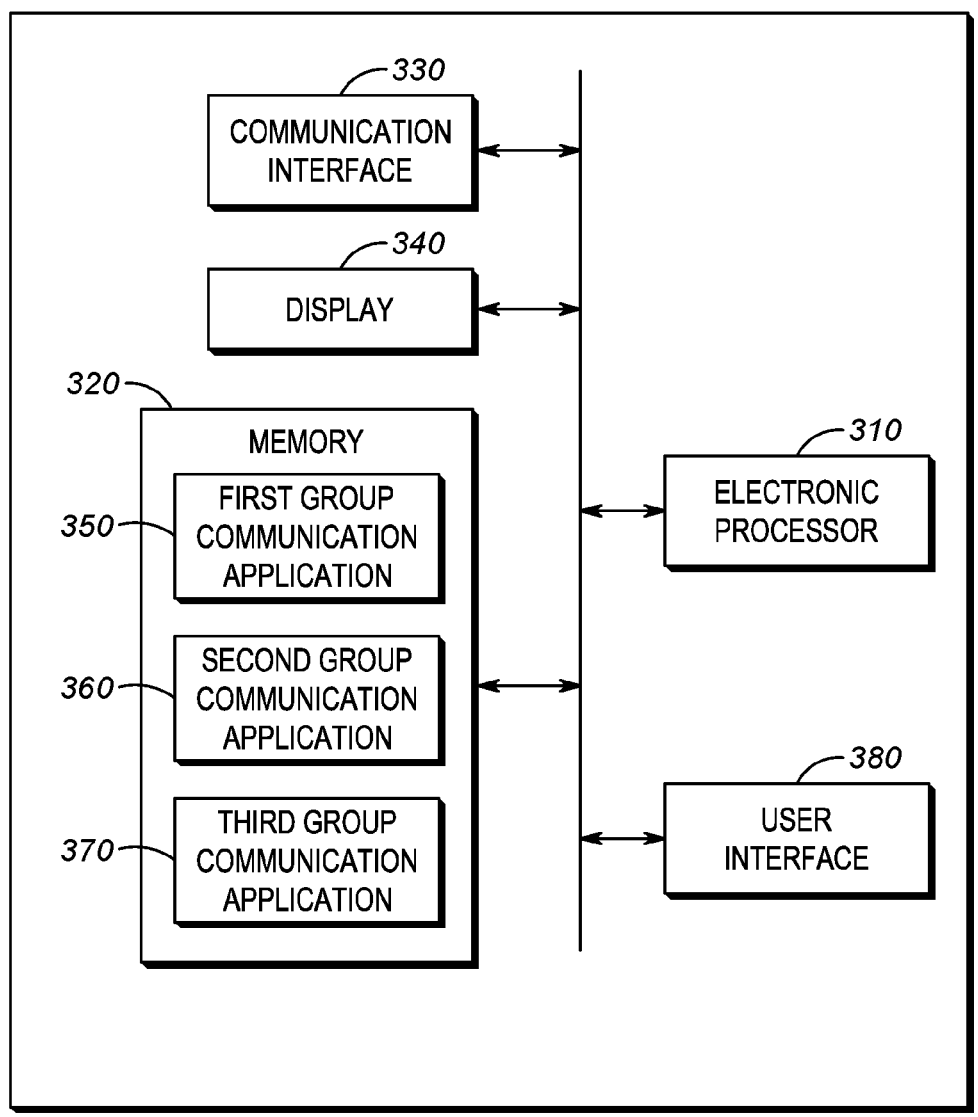
FIG. 3 is a block diagram of a communication device, in accordance with some embodiments.

FIG. 3 is a block diagram of a communication device 120, in accordance with some embodiments. The communication device 120 includes an electronic processor 310, for example, a microprocessor or another electronic device. The electronic processor 310 may include input and output interfaces (not shown) and be electrically connected to a memory 320, a communication interface 330, and a display 340. In some embodiments, the communication device 120 may include fewer or additional components in configurations different from that illustrated in FIG. 3. For example, the communication device may include a speaker and a microphone (not shown) that respectively allows the user of the communication device 120 to listen to and talk during group communications.

The memory 320 includes read-only memory (ROM), random-access memory (RAM), other non-transitory computer-readable media, or a combination thereof. The electronic processor 310 is configured to receive instructions and data from the memory 320 and execute, among other things, the instructions. In particular, the electronic processor 310 executes instructions stored in the memory 320 to perform the methods described herein.

The communication interface 330 sends and receives data to and from the communication network 130. The communication interface 330 may include a transceiver for wirelessly communicating with the communication network 130. Alternatively or in addition, the communication interface 330 may include a connector or port for receiving a wired connection, such as an Ethernet cable. The electronic processor 310 may generate electrical signals and may communicate information relating to the electrical signals over the communication network 130 through the communication interface 330, such as for receipt by the application server 110 and other communication devices 120 operating in the communication system 100. Similarly, the electronic processor 310 may output data received from the communication network 130 through the communication interface 330, through the display 340 or a speaker, or a combination thereof.

In accordance with some embodiments, the memory 320 stores one or more group communication applications that are provided by the application server 110 in accordance with the embodiments described herein. In the embodiment of the communication device 120 shown in FIG. 3, the memory 320 includes a first group communication application 350 that is configured for supporting both voice and data communications, a second group communication application 360 that is configured for supporting voice only communications, and a third group communication application 370 that is configured for supporting data only communications. In other embodiments, the memory 320 may not include all the three group communication applications, but may include one or two of the group communication applications or alternatively include applications other than described above. In one embodiment, the type of group communication application to be provided at the communication device 120 is determined based on the role of the user of the communication device 120. In these embodiments, the application server 110 automatically performs the methods described herein and provides the group communication application with the customized user interface elements at the communication device. In alternative embodiments, the user may send a request via the communication device 120 to the application server 110 to receive a particular group communication application to be provided at the communication device 120.

. The display 340 is a suitable display such as, for example, a liquid crystal display (LCD), or an organic light-emitting diode display (OLED) touch screen. The electronic processor 320 of the communication device 110 causes the display 340 to display the user interface elements corresponding to the group communication application provided by the application server 110. In one embodiment, the communication device 120 may implement a graphical user interface (GUI) (for example, generated by the electronic processor 310, from instructions and data stored in the memory 320) representing the user interface elements corresponding to the group communication application provided by the application server 110. In one embodiment, the graphical user interface elements include one or more of a notification of group communication type (e.g. descriptive dialogs) supported by the group communication application, view control (e.g., sets of tabs) providing a filtered list of communication groups with same group communication type, group representation (e.g. avatar, group lists) to visually distinguish the communication groups based on group communication type, and interoperability control element (e.g. pivot button or menu options) to allow for switching between group communication applications. In accordance with some embodiments, when the display 340 is implemented as a touch screen display that displays the user interface elements, the user can interact (for example, via touch input) with the user interface elements to provide inputs for controlling different functions of group communications.

The user interface 380 operates to receive input from, for example, a user of the communication device 120, to provide system output, or a combination of both. The user interface 380 obtains information and signals from, and provides information and signals to, devices both internal and external to the communication device 120 (for example, over one or more wired and/or wireless connections). Input may be provided via, for example, a keypad, microphone, soft keys, icons, or soft buttons on the display 340, a scroll ball, buttons, and the like. In accordance with some embodiments, the user interface 380 allows the user to control the user interface elements of the group communication device at the communication device 120. In communication devices 120 that operate in PTT communication mode, the user interface 380 additionally includes a soft or physical PTT button with which the user can interact (e.g. press input) to initiate a talk group communication on the selected talk group.

Figure 4:
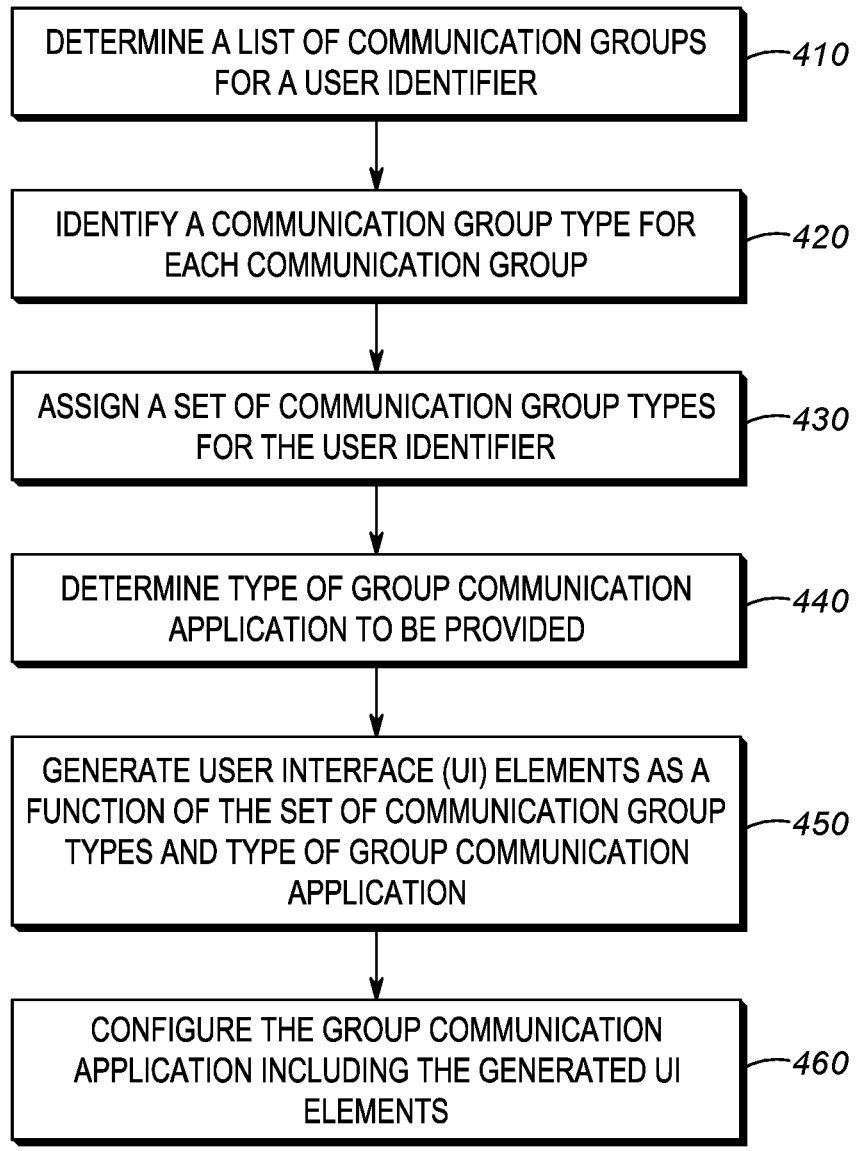
FIG. 4 is a flowchart of a method for providing a customized user interface for group communication at a communication device, in accordance with some embodiments.

FIG. 4 is a flowchart of an exemplary method 400 of providing a customized user interface for group communication at a communication device 120. As an example, the method 400 described herein is performed by the electronic processor 210 of the application server 110. In another implementation, the method 300 may be performed by the electronic processor 310 of the communication device 120. Other embodiments of the method 400 may be performed on multiple processors within the same device or on multiple devices.

At block 410, the electronic processor 210 determines a list of communication groups with which a user identifier of the communication device 120 is registered. In one embodiment, the electronic processor 210 determines the list of communication groups in response to a request by the communication device 120 to receive or update one or more group communication applications for performing group communications. In another embodiment, the electronic processor 210 may receive an instruction from another server to install or configure one or more group communication applications at the communication device 120. The electronic processor 210 may receive user identifier of the communication device 120 for which the group communication application needs to be configured. In one embodiment, the electronic processor 210 determines the list of communication groups by determining a role of a user corresponding to the user identifier and identifying communication groups with which the user identifier is registered based on the role of the user. In another embodiment, the electronic processor 210 receives the list of communication groups associated with the user identifier from one or more other devices (for example, a messaging server) which may maintain information about members of the communication groups. In one implementation, the user identifier is added to the communication groups manually as a member. In another implementation, the user is automatically registered or affiliated to the communication groups based on the role and profile associated with the user. In accordance with some embodiments, the user identifier is added dynamically to one or more communication groups, for example, in response to an incident, based on the user's profile.

At block 420, the electronic processor 210 identifies a communication group type for each communication group in the list. In accordance with some embodiments, the communication group type for each communication group is determined based on the service capabilities of the communication group. As described above with reference to FIG. 2, the service capabilities of a communication group are determined, for example, based on whether the communication group supports or is configured for voice only (V-o) capability, or data only (D-o) capability, or both voice and data (V+D) capability. In one embodiment, the electronic processor 210 receives information identifying the service capabilities of a communication group from one or more messaging servers (or talk group server in case of PTT communications) that may be responsible for managing the communication group. The communication group type for each communication group in the list is determined as one of: a) V+D group type; b) V-o group type; or c) D-o group type depending on the service capabilities of the respective group. For example, A communication group is determined as 'V+D' group type when the communication group is configured to support both voice and data communications. A communication group is determined as 'V-o' group type when the communication group is configured to support voice only communications. A communication group is determined as 'D-o' group type when the communication group is configured to support data only communications. In accordance with some embodiments, the electronic processor 210 stores the identified communication group type for each communication group in the memory 220.

At block 430, the electronic processor 210 assigns a set of communication group type for the user identifier. The set of communication group types assigned to the user identifier includes the identified communication group type (described in block 420) for each of the communication groups in the list for the user identifier. In accordance with some embodiments, the electronics processor 210 use this information i.e. set of communication group types assigned to the user identifier to determine the customization required in the user interface elements for the group communication application to be provided to the corresponding communication device 120. In accordance with some embodiments, the customization required in the user interface elements may vary for different user identifiers depending on the corresponding communication groups with which the user identifiers are registered.

Depending on the combination of the communication group types identified for all the communication groups in the list, the set of communication group types assigned to the user identifier is selected from one of the following: a) a first set indicating that all communication groups in the list have V+D capability, and for example represented as {V+D}; b) a second set indicating two subsets of communication groups in the list, a first subset with communication groups having V+D capability and a second subset with communication groups having V-o capability, and for example represented as {V+D, V-o}; c) a third set indicating two subsets of communication groups in the list, a first subset with communication groups having V+D capability and a second subset with communication groups having D-o capability, and for example represented as {V+D, D-o}; d) a fourth set indicating three subsets of communication groups in the list, a first subset with communication groups having V+D capability, a second subset with communication groups having V-o capability, and a third subset with communication groups having D-o capability, and for example, represented as {V+D, V-o, D-o}; a fifth set indicating two subsets of communication groups in the list, a first subset with communication groups having V-o capability and a second subset with communication groups having D-o capability, and for example represented as {V-o, D-o}; a sixth set indicating that all communication groups in the list have V-o capability, and for example represented as {V-o}; and a seventh set indicating that all communication group in the list have D-o capability, and for example represented as {D-o}.

At block 450, the electronic processor 210 determines the type of group communication to be provided at the communication device 120. In accordance with some embodiments, the group communication application to be provided at the communication device 120 corresponding to a user identifier may be of different types. For example, the group communication application may be of a first application type that is configured for both voice and data communications, a second application type that is configured for voice only communications, or a third application type that is configured for data only communications. In one embodiment, the electronic processor 210 determines the type of group communication application to be provided at the communication device 120 based on information contained in a request received from the communication device 120 or another device or server. In another embodiment, the electronic processor 210 may automatically determine the type of group communication applications to be provided at the communication device 120 based at least in part on role, rank, security privileges, and operating characteristics of the communication device 120 (e.g. device type and network connection).

Next, at block 450, the electronic processor 210 generates user interface elements for the group communication application to be provided at the communication device 120 of the user identifier as a function of the assigned set of communication group types and further the type of group communication application to be provided at the communication device 120.

For example, assume that a user with user identifier 'John12' is registered with three communication groups, namely detective A group, detective B group, and detective C group. Suppose, if the electronic processor 210 determines that the communication group type for detective A and B groups is D-o group type and communication group type for detective C group is V+D group type, then the set of communication group type assigned to the user identifier 'John12' includes {V+D, D-o} i.e. the third set that indicates a first subset with communication groups having V+D capability and a second subset with communication groups having D-o capability. Further, assume that the type of group communication application to be provided to the user identifier 'John12' is a second application type that supports voice only communications. In this case, the electronic processor 210 of the applications server 110 generates user interface elements that are representative of the communication groups having V+D capability, but excludes user interface elements that are representative of the communication groups having D-o capability. In other words, the electronic processor 210 configures the group communication application to be provided at the communication device 120, such that the group communication application includes only user interface elements (e.g. avatar representation or group lists) corresponding to 'detective C' group since 'detective C' group supports both voice and data capability while the group communication application (i.e. of second application type) itself supports voice only communications. Further, in this case, the application server 110 excludes or does not generate user interface elements corresponding to 'detective A' and 'detective B' communication groups since these groups are of D-o group type, but the group communication application to be provided at the communication device 120 is of second application type that supports voice only communications.

Accordingly, the user interface elements are customized, for example, the elements corresponding to each communication group is included or excluded from the group communication application based on the type of group communication application and the resulting set of communication group types assigned to the user identifier. Further examples for user interface elements that are customized according to each combination of application type and assigned set of communication group types are shown in FIGS. 5-11, and the resulting user interface elements for different combination of application types and assigned set of communication group types are further described below.

Figure 5:
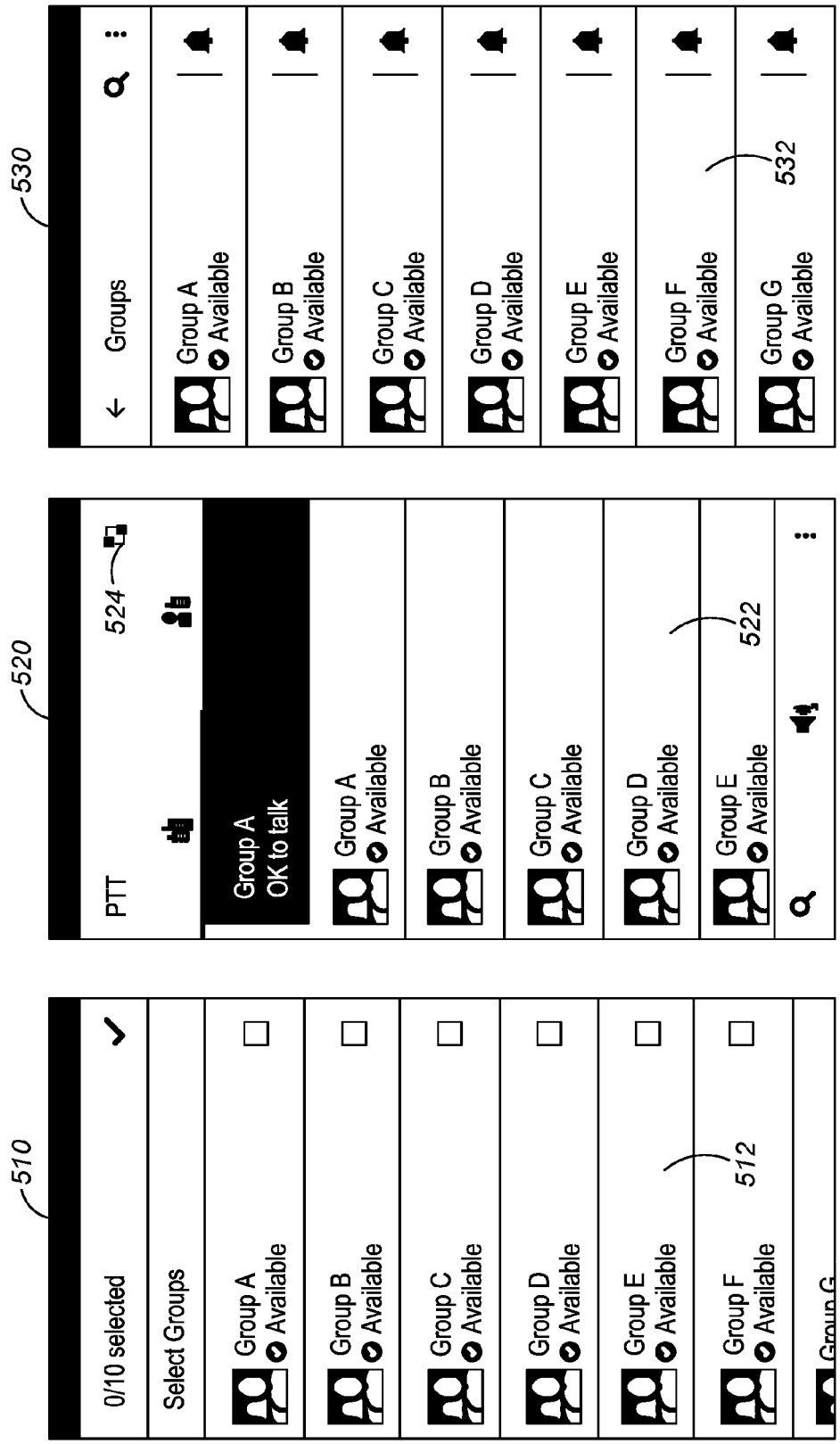
FIG. 5 illustrates an example of the user interface elements generated at the communication device for different application types when a first set of communication group types is assigned to the user identifier.

In accordance with embodiments, when the set of communication group types assigned to the user identifier corresponds to the first set and further when the group communication application is either of first application type, second application type, or third application type, the electronic processor 210 of the application server 110 generates user interface elements that are representative of the communication groups having V+D capability (see FIG. 5).

When the set of communication group types assigned to the user identifier corresponds to the second set and further when the group communication application is of first application type or second application type, the electronic processor 210 generates user interface elements that are representative of the communication groups having V+D capability and V-o capability. In this case, when the group communication application is of third application type, the electronic processor 210 generates user interface elements that are representative of communication groups having V+D capability, but excludes UI elements that are representative of communication groups having V-o capability (see FIG. 6).

When the set of communication group types assigned to the user identifier corresponds to the third set and further when the group communication application is of first application type or third application type, the electronic processor 210 generates user interface elements that are representative of communication groups having V+D capability and D-o capability. In this case, when the group communication application is of second application type, the electronic processor 210 generates user interface elements that are representative of communication groups having V+D capability, but excludes UI elements that are representative of communication groups having D-o capability (see FIG. 7)

When the set of communication group types assigned to the user identifier corresponds to the fourth set and further when the group communication application is of first application type, the electronic processor 210 generates user interface elements that are representative of the communication groups having V+D capability, V-o capability, and D-o capability. In this case, when the group communication application is of second application type, the electronic processor 210 generates user interface elements that are representative of communication groups having V+D capability and V-o capability, but excludes UI elements that are representative of communication groups having D-o capability. Further, in this case, when the group communication application is of third application type, the electronic processor 210 generates user interface elements that are representative of the communication groups having V+D capability and D-o capability, but excludes UI elements that are representative of communication groups having V-o capability (see FIG. 8).

When the set of communication group types assigned to the user identifier corresponds to the fifth set and further when the group communication application is of first application type, the electronic processor 210 generates user interface elements that are representative of the communication groups having V-o capability and D-o capability. In this case, when the group communication application is of second application type, the electronic processor 210 generates user interface elements that are representative of communication groups having V-o capability, but excludes UI elements that are representative of communication groups having D-o capability. Further, in this case, when the group communication application is of third application type, the electronic processor 210 generates user interface elements that are representative of the communication groups having D-o capability, but excludes UI elements that are representative of communication groups having V-o capability (see FIG. 9).

When the set of communication group types assigned to the user identifier corresponds to the sixth set and further when the group communication application is of first application type or second application type, the electronic processor 210 generates user interface elements that are representative of the communication groups having V-o capability. In this case, when the group communication application is of third application type, the electronic processor 210 excludes or does not generate UI elements that are representative of communication groups having V-o capability (see FIG. 10).

When the set of communication group types assigned to the user identifier corresponds to the seventh set and further when the group communication application is of first application type or third application type, the electronic processor 210 generates user interface elements that are representative of the communication groups having D-o capability. In this case, when the group communication application is of second application type, the electronic processor 210 excludes or does not generate UI elements that are representative of communication groups having D-o capability (see FIG. 11).

At block 460, the electronic processor 210 configures the group communication application including the generated user elements at the communication device 120. In one embodiment, the electronic processor 210 provides instructions including the group communication application and the generated user interface elements to be configured at the communication device 120. The electronic processor 310 at the communication device 120 receives the instructions from the application server 110 and configures the group communication application and user interface elements at the communication device 120 based on the instructions received from the application server 110. In one embodiment, the electronic processor 310 at the communication device 120 also generates a graphical user interface (GUI) corresponding to the user interface elements. In one embodiment, the user interface elements are dynamically updated at the communication device 120 in response to detecting a change in the service capabilities (i.e. communication group type) of one or more communication groups or alternatively in response to addition or removal of one or more communication groups affiliated to a user identifier. In accordance with embodiments, the method 400 described herein is repeated for each type of group communication application to be provided (or updated) at the communication device 120.

FIG. 5 illustrates an example of the user interface elements generated at the communication device 120 when the first set of communication group types is assigned to the user identifier. In this example, the communication groups (indicated as Groups A-F) with which the user identifier is registered, are of V+D group type i.e. all communication groups (Groups A-F) have V+D capability. In FIG. 5, three different user interface screenshots each corresponding to a different application type configured for the user identifier at the communication device 120 is shown. The user interface 510 corresponds to a group communication application of a first application type that is configured for supporting both voice and data communications. The user interface 520 corresponds to a group communication application of a second application type that is configured for supporting voice only communications. The user interface 530 corresponds to a group communication application of a third application type that is configured for supporting data only communications.

The user interfaces 510, 520, 530 further respectively include user interface elements that are arranged to represent a list of communication groups 512, 522, 532 available to the user corresponding to the application type. Each communication group in the list 512, 522, 532 is respectively represented by an avatar to visually represent the service capabilities of the communication groups. For example, avatars corresponding to communication groups (Groups A-F) in FIG. 5 are represented by the same image as all the communication groups in this example are of V+D group type having both voice and data service capabilities. In the example shown in FIG. 5, the communication groups with which the user identifier is registered supports both voice and data service capabilities and further each of the first, second, and third application types support either or both voice and data capabilities, therefore the communication groups list 512, 522, 532 for each of the first, second, and application types includes all the communication groups (Groups A-F) with which the user identifier is registered. The user can select one or more of the communication groups (Groups A-F) arranged in the list 512, 522, 532 to perform voice and data communications with other users within the selected communication groups. In the example shown in FIG. 5, the user interface 520 corresponding to the second application type further includes an interoperability user interface element 524 (also referred to as pivot button) that is configured to receive user input to switch directly from one group communication application to another group communication application (of same or different application type) for one or more selected communication groups having common communication group type.

Figure 6:
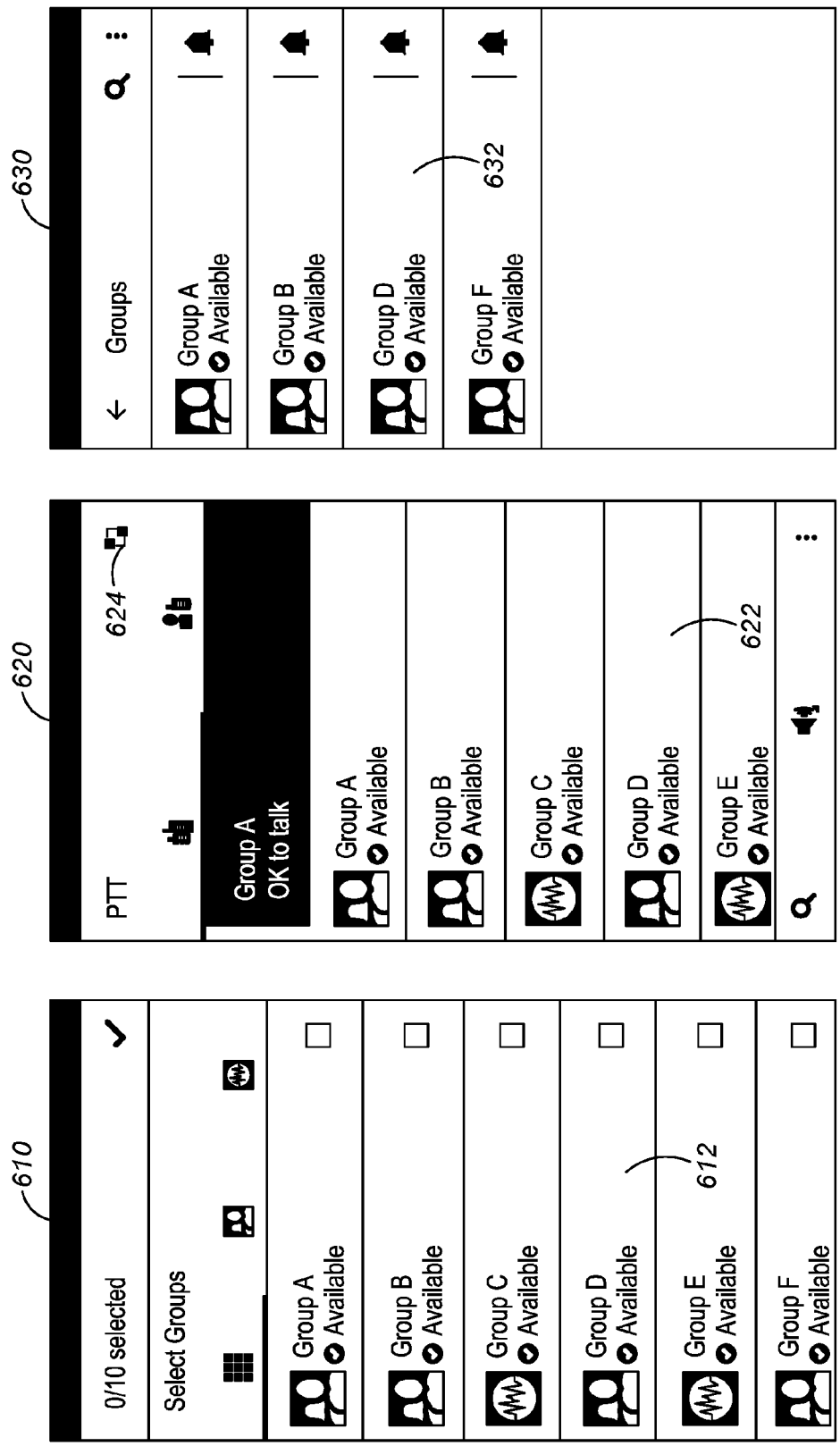
FIG. 6 illustrates an example of the user interface elements generated at the communication device for different application types when a second set of communication group types is assigned to the user identifier.

FIG. 6 illustrates an example of the user interface elements generated at the communication device 120 when the second set of communication group types is assigned to the user identifier. In this example, the communication groups (indicated as Groups A-F) with which the user identifier is registered, includes a first subset of communication groups that are of V+D group i.e. Groups A, B, D, F, and a second subset of communication groups that are of V-o group type i.e. Groups C, E. In FIG. 6, three different user interface screenshots each corresponding to a different application type configured for the user identifier at the communication device 120 is shown. The user interface 610 corresponds to a group communication application of a first application type that is configured for supporting both voice and data communications. The user interface 620 corresponds to a group communication application of a second application type that is configured for supporting voice only communications. The user interface 630 corresponds to a group communication application of a third application type that is configured for supporting data only communications. The user interfaces 610, 620, 630 further respectively include user interface elements that are arranged to represent a list of communication groups 612, 622, 632 available to the user corresponding to the application type.

Each communication group in the list 612, 622, 632 is respectively represented by an avatar to visually represent the service capabilities of communication groups. For example, avatars corresponding to Groups A, B, D, F represent that the groups have V+D capability and avatars corresponding to Groups C, E represent that the groups have V-o capability. Further, the list 612 corresponding to first application type includes all communication groups i.e. Groups A-F since the first application type supports both voice and data communications. The list 622 corresponding to the second application type also includes all communication groups, since Groups A, B, D, F have V+D capability and Groups C, E have V-o capability. The list 632 corresponding to the third application type includes only a subset of communication groups (i.e. Groups A, B, D, F having V+D capability) with which the user identifier is registered and Groups C, E are excluded since these groups are configured for V-o capability and third application type does not support V-o capability. In the example shown in FIG. 6, the user interface 620 corresponding to the second application type further includes an interoperability user interface element 624 (also referred to as pivot button) that is configured to receive user input to switch directly from one group communication application to another group communication application (of same or different application type) for one or more selected communication groups having common communication group type.

Figure 7:
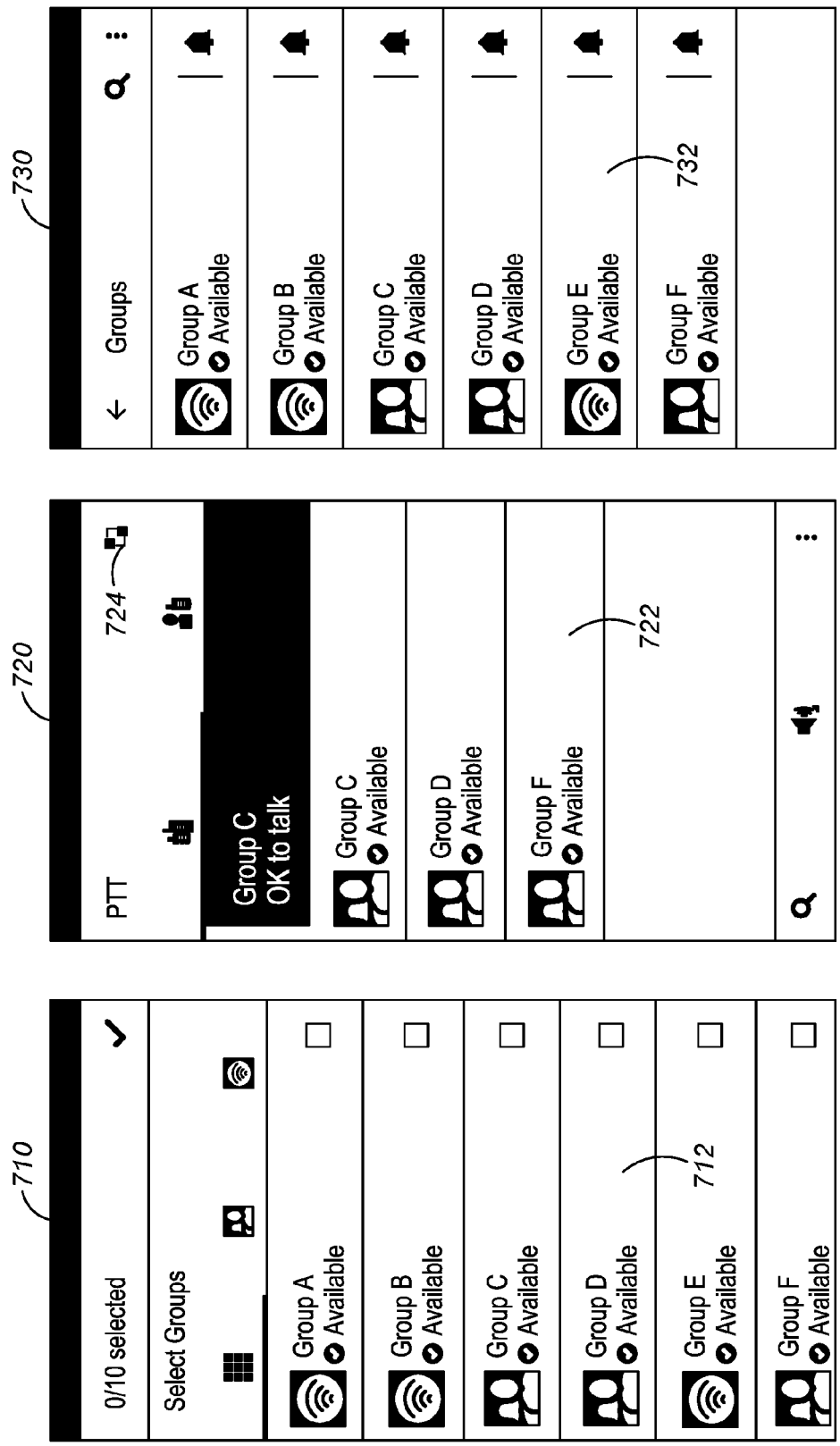
FIG. 7 illustrates an example of the user interface elements generated at the communication device for different application types when a third set of communication group types is assigned to the user identifier.

FIG. 7 illustrates an example of the user interface elements generated at the communication device 120 when the third set of communication group types is assigned to the user identifier. In this example, the communication groups (indicated as Groups A-F) with which the user identifier is registered, includes a first subset of communication groups that are of V+D group type i.e. Groups C, D, F, and a second set of communication groups that are of D-o group type i.e. Groups A, B, E. In FIG. 7, three different user interface screenshots each corresponding to a different application type configured for the user identifier at the communication device 120 is shown. The user interface 710 corresponds to a group communication application of a first application type that is configured for supporting both voice and data communications. The user interface 720 corresponds to a group communication application of a second application type that is configured for supporting voice only communications. The user interface 730 corresponds to a group communication application of a third application type that is configured for supporting data only communications. The user interfaces 710, 720, 730 further respectively includes user interface elements that are arranged to represent a list of communication groups 712, 722, 732 available to the user corresponding to the application type.

Each communication group in the list is respectively represented by an avatar to visually represent the service capabilities of the communication groups. For example, avatars corresponding to Groups A, B, E represent that the communication groups have D-o capability and avatars corresponding to Groups C, D, F represent that the communication groups have V+D capability. Further, the list 712 corresponding to first application type includes all communication groups i.e. Groups A-F since the first application type supports both voice and data communications. The list 732 corresponding to the third application type also includes all communication groups, since Groups C, D, F having V+D capability and Groups A, B, E have D-o capability. The list 722 corresponding to the second application type includes only a subset of communication groups (i.e. Groups C, D, F having V+D capability) with which the user identifier is registered and Groups A, B, E are excluded since these groups are configured for D-o capability and second application type does not support D-o capability. In the example shown in FIG. 7, the user interface 720 corresponding to the second application type further includes an interoperability user interface element 724 (also referred to as pivot button) that is configured to receive user input to switch directly from one group communication application to another group communication application (of same or different application type) for one or more selected communication groups having common communication group type.

Figure 8:
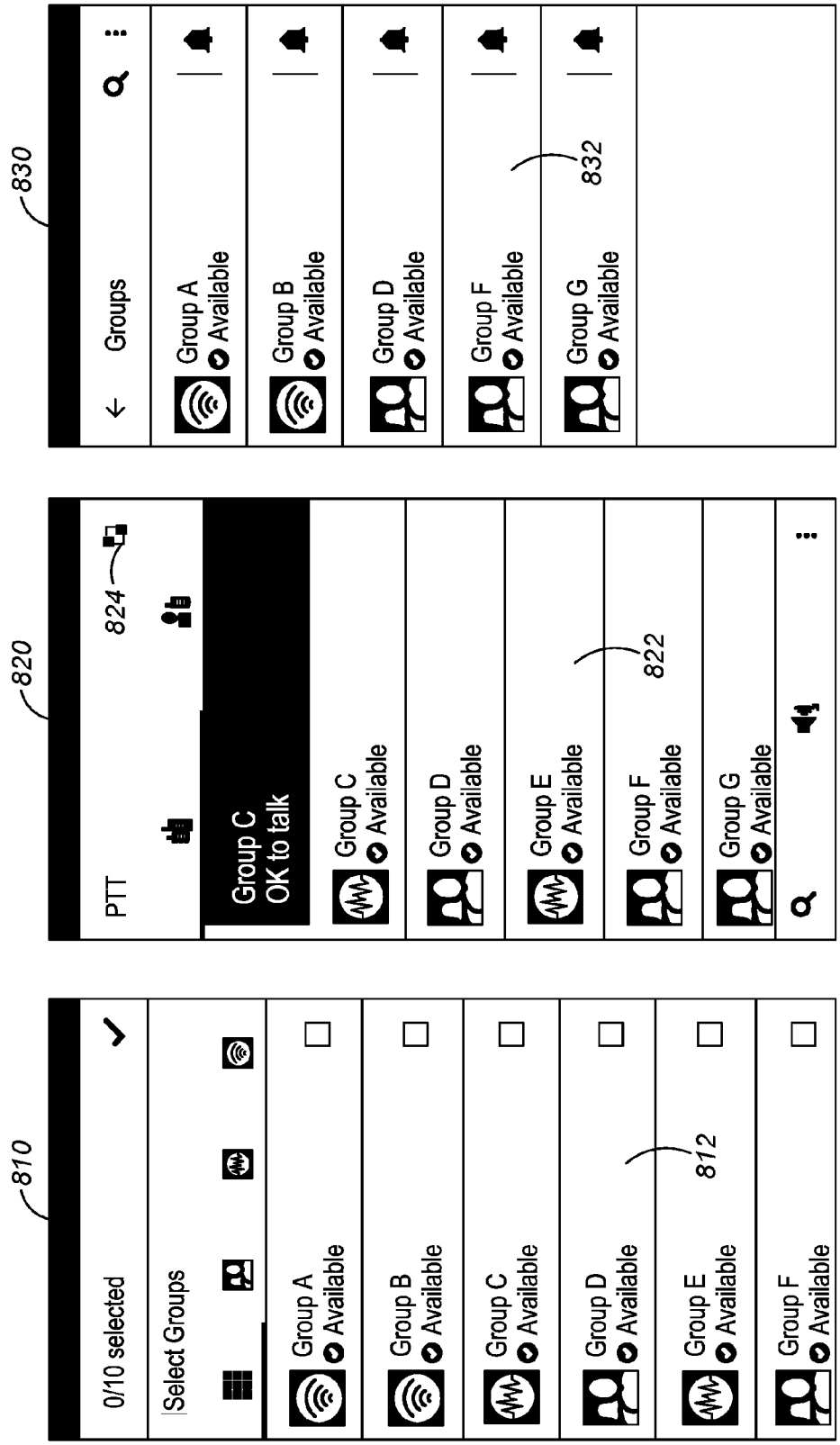
FIG. 8 illustrates an example of the user interface elements generated at the communication device for different application types when a fourth set of communication group types is assigned to the user identifier.

FIG. 8 illustrates an example of the user interface elements generated at the communication device 120 when the fourth set of communication group types is assigned to the user identifier. In this example, the communication groups (indicated as Groups A-G) with which the user identifier is registered, includes a first subset of communication groups that are of V+D group type i.e. Groups D, F, G, a second set of communication groups that are of V-o group type i.e. Groups C, E, and third set of communication groups that are of D-o group type i.e. Groups A, B. In FIG. 7, three different user interface screenshots each corresponding to a different application type configured for the user identifier at the communication device 120 is shown. The user interface 810 corresponds to a group communication application of a first application type that is configured for supporting both voice and data communications. The user interface 820 corresponds to a group communication application of a second application type that is configured for supporting voice only communications. The user interface 830 corresponds to a group communication application of a third application type that is configured for supporting data only communications. The user interfaces 810, 820, 830 further respectively includes user interface elements that are arranged to represent a list of communication groups 812, 822, 832 available to the user corresponding to the application type.

Each communication group in the list is respectively represented by an avatar to visually represent the service capabilities of the communication groups. For example, avatars corresponding to Groups D, F, G, represent that the communication groups have V+D capability, Groups C, E represent that the communication groups have V-o capability, and Groups A, B represent that the communication groups have D-o capability. Further, the list 812 corresponding to first application type includes all communication groups i.e. Groups A-G since the first application type supports both voice and data communications. The list 822 corresponding to the second application type includes only subset of groups i.e. Groups C-G since these groups have V+D or V-o capability and second application type supports voice only communications. The list 832 corresponding to third application type includes only communication groups A, B, D, F, G since these groups have V+D or D-o capability and third application type supports data only communications. In the example shown in FIG. 8, the user interface 820 corresponding to the second application type further includes an interoperability user interface element 824 (also referred to as pivot button) that is configured to receive user input to switch directly from one group communication application to another group communication application (of same or different application type) for one or more selected communication groups having common communication group type.

Figure 9:
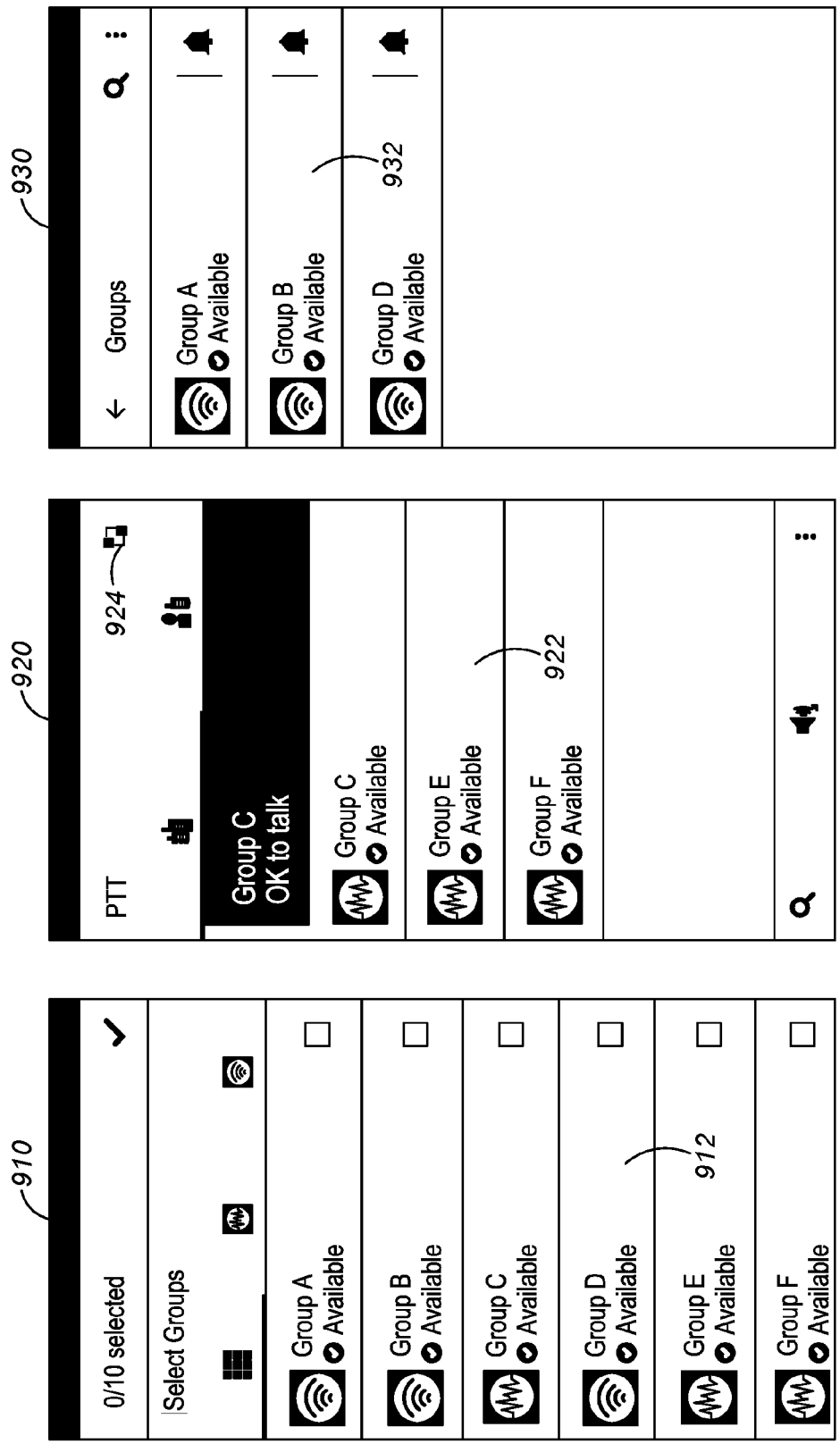
FIG. 9 illustrates an example of the user interface elements generated at the communication device for different application types when a fifth set of communication group types is assigned to the user identifier.

FIG. 9 illustrates an example of the user interface elements generated at the communication device 120 when the fifth set of communication group types is assigned to the user identifier. In this example, the communication groups (indicated as Groups A-F) with which the user identifier is registered, includes a first subset of communication groups that are of V-o group type i.e. Groups C, E, F, and a second set of communication groups that are of D-o group type i.e. Groups A, B, D. In FIG. 7, three different user interface screenshots each corresponding to a different application type configured for the user identifier at the communication device 120 is shown. The user interface 910 corresponds to a group communication application of a first application type that is configured for supporting both voice and data communications. The user interface 920 corresponds to a group communication application of a second application type that is configured for supporting voice only communications. The user interface 930 corresponds to a group communication application of a third application type that is configured for supporting data only communications. The user interfaces 910, 920, 930 further respectively includes user interface elements that are arranged to represent a list of communication groups 912, 922, 932 available to the user corresponding to the application type.

Each communication group in the list is respectively represented by an avatar to visually represent the service capabilities of the communication groups. For example, avatars corresponding to Groups C, E, F represent that the communication groups have V-o capability and avatars corresponding to Groups A, B, D. represent that the communication groups have D-o capability. Further, the list 912 corresponding to first application type includes all communication groups i.e. Groups A-F since the first application type supports both voice and data communications. The list 922 corresponding to the second application type includes only Groups C, E, F having V-o capability since second application type supports only voice communications. The list 932 corresponding to the third application type includes only Groups A, B, D having D-o capability since third application type supports only data communications. In the example shown in FIG. 9, the user interface 920 corresponding to the second application type further includes an interoperability user interface element 924 (also referred to as pivot button) that is configured to receive user input to switch directly from one group communication application to another group communication application (of same or different application type) for one or more selected communication groups having common communication group type.

Figure 10:
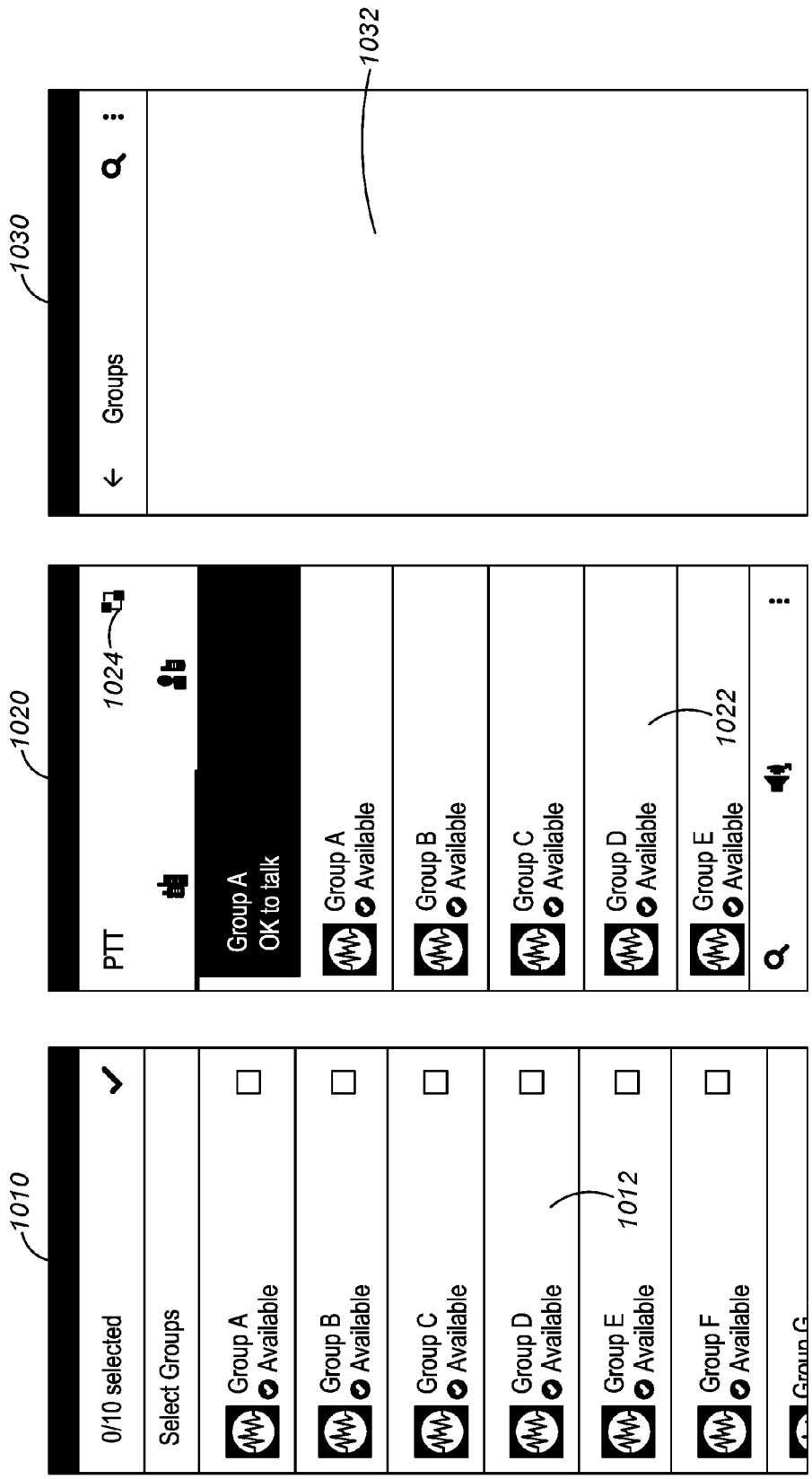
FIG. 10 illustrates an example of the user interface elements generated at the communication device for different application types when a sixth set of communication group types is assigned to the user identifier.

FIG. 10 illustrates an example of the user interface elements generated at the communication device 120 when the sixth set of communication group types is assigned to the user identifier. In this example, the communication groups (indicated as Groups A-G) with which the user identifier is registered, includes all communication groups that are of V-o group type. In FIG. 10, three different user interface screenshots each corresponding to a different application type configured for the user identifier at the communication device 120 is shown. The user interface 1010 corresponds to a group communication application of a first application type that is configured for supporting both voice and data communications. The user interface 1020 corresponds to a group communication application of a second application type that is configured for supporting voice only communications. The user interface 1030 corresponds to a group communication application of a third application type that is configured for supporting data only communications. The user interfaces 1010, 1020, 1030 further respectively includes user interface elements that are arranged to represent a list of communication groups 1012, 1022, 1032 available to the user corresponding to the application type.

Each communication group in the list is respectively represented by an avatar to visually represent the service capabilities of the communication groups. For example, avatars corresponding to Groups A-G represent that the communication groups have V-o capability. Further, the list 1012 corresponding to first application type includes all communication groups i.e. Groups A-G since the first application type supports both voice and data communications. The list 1022 corresponding to the second application type also includes all communication groups i.e. Groups A-G having V-o capability since second application type supports voice only communications. The list 832 corresponding to the third application type does not include any of the communication groups since third application type supports data only communications. In the example shown in FIG. 10, the user interface 1020 corresponding to the second application type further includes an interoperability user interface element 1024 (also referred to as pivot button) that is configured to receive user input to switch directly from one group communication application to another group communication application (of same or different application type) for one or more selected communication groups having common communication group type.

Figure 11:
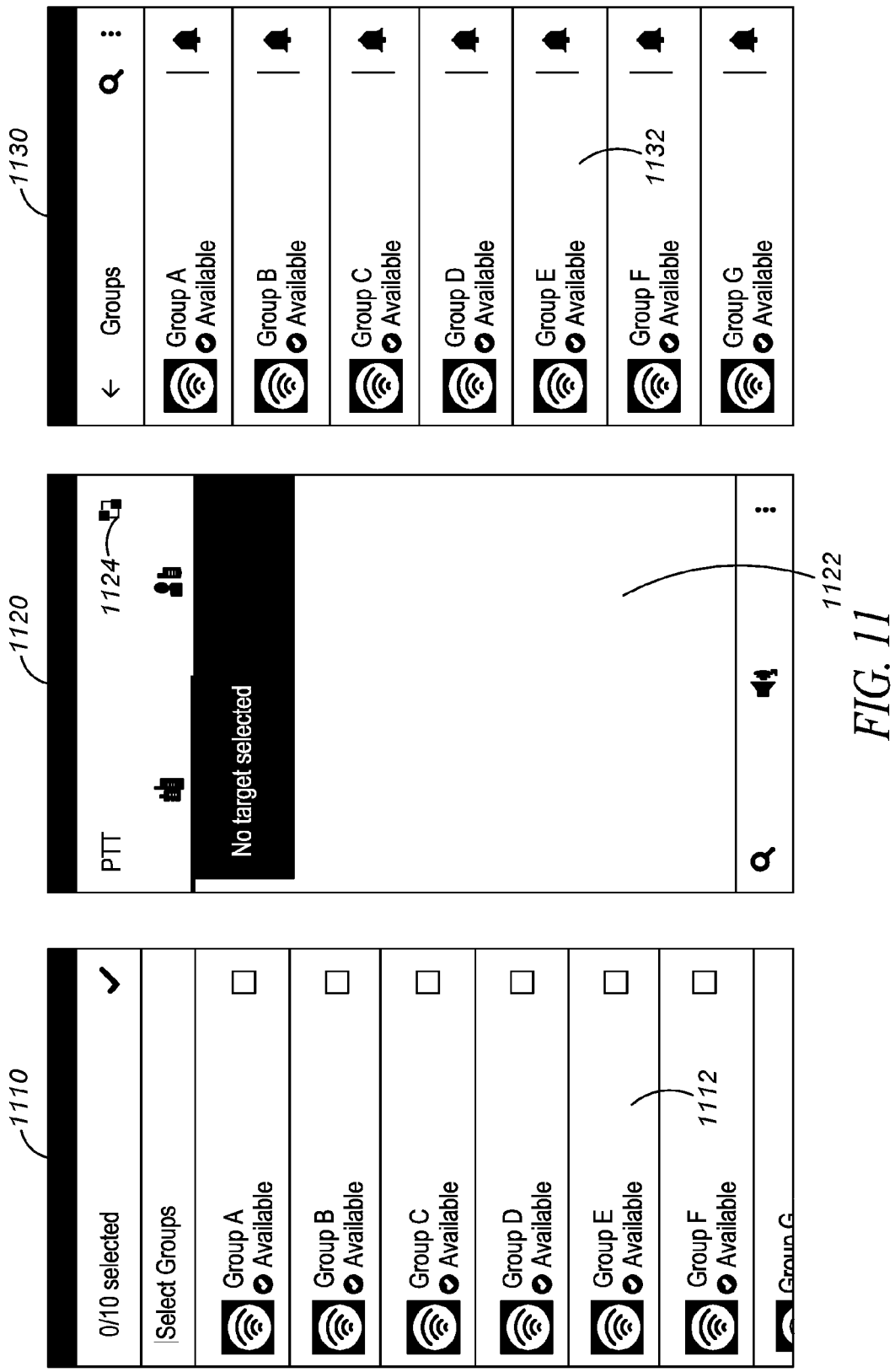
FIG. 11 illustrates an example of the user interface elements generated at the communication device for different application types when a seventh set of communication group types is assigned to the user identifier.

FIG. 11 illustrates an example of the user interface elements generated at the communication device 120 when the sixth set of communication group types is assigned to the user identifier. In this example, the communication groups (indicated as Groups A-G) with which the user identifier is registered, includes all communication groups that are of D-o group type. In FIG. 11, three different user interface screenshots each corresponding to a different application type configured for the user identifier at the communication device 120 is shown. The user interface 1110 corresponds to a group communication application of a first application type that is configured for supporting both voice and data communications. The user interface 1120 corresponds to a group communication application of a second application type that is configured for supporting voice only communications. The user interface 1130 corresponds to a group communication application of a third application type that is configured for supporting data only communications. The user interfaces 1110, 1120, 1130 further respectively includes user interface elements that are arranged to represent a list of communication groups 1112, 1122, 1132 available to the user corresponding to the application type.

Each communication group in the list is respectively represented by an avatar to visually represent the service capabilities of the communication groups. For example, avatars corresponding to Groups A-G represent that the communication groups have D-o capability. Further, the list 1112 corresponding to first application type includes all communication groups i.e. Groups A-G since the first application type supports both voice and data communications. The list 1132 corresponding to the third application type also includes all communication groups i.e. Groups A-G having D-o capability since third application type supports data only communications. The list 1122 corresponding to the second application type does not include any of the communication groups since second application type supports voice only communications. In the example shown in FIG. 11, the user interface 1120 corresponding to the second application type further includes an interoperability user interface element 1124 (also referred to as pivot button) that is configured to receive user input to switch directly from one group communication application to another group communication application (of same or different application type) for one or more selected communication groups having common communication group type.

In accordance with embodiments of the disclosure, the method described herein can be advantageously employed to simplify the user interface elements that are presented to the user for performing group communications. In particular, the method described herein includes or excludes user interface elements corresponding to communication groups based on the service capabilities of all the communication groups with which the user is registered and also based on whether the application itself supports such service capabilities. This ensures that irrelevant and superfluous user elements are not presented to the user. This customization of user interface elements based on the service capabilities of the communication groups reduces the complexity associated with managing the communication groups and interoperability between different communication applications. The method described herein can also be employed to scale the complexity of application user interfaces used by public safety users.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for providing a customized user interface for group communication at a communication device, the method comprising:
   determining, by an electronic processor, a list of communication groups with which a user identifier of the communication device is registered;
   identifying, by the electronic processor, a communication group type for each of the communication groups in the list, wherein the communication group type identified for each communication group is based at least in part on service capabilities of the respective communication group;
   assigning, by the electronic processor, a set of communication group types for the user identifier, the set of communication group types including the identified communication group type for each of the communication groups in the list;
   determining, by the electronic processor, a type of group communication application to be configured at the communication device;
   generating, by the electronic processor, one or more graphical user interface (GUI) elements as a function of the set of communication group types and the type of group communication application; and
   configuring, by the electronic processor, the group communication application including the generated GUI elements at the communication device for supporting group communication associated with the user identifier, wherein the GUI elements are selected from the group consisting of notification of group communication type supported by the group communication application, view control providing a filtered list of communication groups with same group communication type, group representation to visually distinguish the communication groups based on group communication type, and interoperability control element to allow for switching between group communication applications.

2. The method of claim 1, wherein determining a list of communication groups comprises:
   determining a role of a user corresponding to the user identifier; and
   identifying communication groups with which the user identifier is registered based on the role of the user.

3. The method of claim 1, further comprising:
   repeating the steps of determining a type of group communication application, generating one or more GUI elements, and configuring the group communication application for each type of group communication application to be configured at the communication device.

4. The method of claim 1, wherein the service capabilities of the communication group are selected from the group consisting of: voice only (V-o) capability, data only (D-o) capability, and voice and data (V+D) capability.

5. The method of claim 4, wherein the set of communication group types assigned to the user identifier is selected from the group consisting of:
   a first set indicating that all communication groups in the list have V+D capability;

a second set indicating two subsets of communication groups in the list, a first subset with communication groups having V+D capability and a second subset with communication groups having V-o capability;

a third set indicating two subsets of communication groups in the list, a first subset with communication groups having V+D capability and a second subset with communication groups having D-o capability;

a fourth set indicating three subsets of communication groups in the list, a first subset with communication groups having V+D capability, a second subset with communication groups having V-o capability, and third subset with communication groups having D-o capability;

a fifth set indicating two subsets of communication groups in the list, a first subset with communication groups having V-o capability and a second subset with communication groups having D-o capability;

a sixth set indicating that all communication groups in the list have V-o capability; and a seventh set indicating that all communication group in the list have D-o capability.

6. The method of claim 5, wherein determining a type of group communication application comprises at least one of:

determining that the group communication application is of a first application type when the group communication application is configured for both voice and data communications;

determining that the group communication application is of a second application type when the group communication application is configured for voice only communications; and determining that the group communication application is of a third application type when the group communication application is configured for data only communications.

7. The method of claim 6, wherein when the type of group communication application is determined as the first application type, and further wherein generating one or more GUI elements comprises:

generating the one or more GUI elements that are representative of the communication groups having V+D capability when the set of communication group types corresponds to the first set;

generating the one or more GUI elements that are representative of the communication groups having V+D capability and V-o capability when the set of communication group types corresponds to the second set;

generating the one or more GUI elements that are representative of the communication groups having V+D capability and D-o capability when the set of communication group types corresponds to the third set;

generating the one or more GUI elements that are representative of the communication groups having V+D capability, V-o capability, and D-o capability when the set of communication group types corresponds to the fourth set;

generating the one or more GUI elements that are representative of the communication groups having V-o capability and D-o capability when the set of communication group types corresponds to the fifth set;

generating the one or more GUI elements that are representative of the communication groups having V-o capability when the set of communication group types corresponds to the sixth set; and generating the one or more GUI elements that are representative of the communication groups having D-o capability when the set of communication group types corresponds to the seventh set.

8. The method of claim 6, wherein when the type of application is the second application type, and further wherein generating one or more GUI elements comprises:

generating the one or more GUI elements that are representative of the communication groups having V+D capability when the set of communication group types corresponds to the first set;

generating the one or more GUI elements that are representative of the communication groups having V+D capability and V-o capability when the set of communication group types corresponds to the second set;

generating the one or more GUI elements that are representative of the communication groups having V+D capability and further excluding GUI elements that are representative of communication groups having D-o capability when the set of communication group types corresponds to the third set;

generating the one or more GUI elements that are representative of the communication groups having V+D capability and V-o capability, and further excluding GUI elements that are representative of communication groups having D-o capability when the set of communication group types corresponds to the fourth set;

generating the one or more GUI elements that are representative of the communication groups having V-o capability, and further excluding GUI elements that are representative of communication groups having D-o capability when the set of communication group types corresponds to the fifth set;

generating the one or more GUI elements that are representative of the communication groups having V-o capability when the set of communication group types corresponds to the sixth set; and generating the one or more GUI elements that exclude GUI elements that are representative of the communication groups having D-o capability when the set of communication group types corresponds to the seventh set.

9. The method of claim 6, wherein when the type of application is the third application type, and further wherein generating one or more GUI elements comprises:

generating the one or more GUI elements that are representative of the communication groups having V+D capability when the set of communication group types corresponds to the first set;

generating the one or more GUI elements that are representative of the communication groups having V+D capability and further excluding GUI elements that are representative of communication groups having V-o capability when the set of communication group types corresponds to the second set;

generating the one or more GUI elements that are representative of the communication groups having V+D capability and D-o capability when the set of communication group types corresponds to the third set;

generating the one or more GUI elements that are representative of the communication groups having V+D capability and D-o capability, and further excluding GUI elements that are representative of communication groups having V-o capability when the set of communication group types corresponds to the fourth set;

generating the one or more GUI elements that are representative of the communication groups having D-o capability, and further excluding GUI elements that are representative of communication groups having V-o capability when the set of communication group types corresponds to the fifth set;

generating the one or more GUI elements that exclude GUI elements that are representative of the communication groups having V-o capability when the set of communication group types corresponds to the sixth set; and generating the one or more GUI elements that are representative of the communication groups having D-o capability when the set of communication group types corresponds to the seventh set.

10. An application server, comprising:
a communication interface; and
an electronic processor coupled to the communication interface, the electronic processor configured to:
determine a list of communication groups with which a user identifier of a communication device is registered;
identify a communication group type for each of the communication groups in the list, wherein the communication group type identified for each communication group is based at least in part on service capabilities of the respective communication group;
assign a set of communication group types for the user identifier, the set of communication group types including the identified communication group type for each of the communication groups in the list;
determine a type of group communication application to be configured at the communication device;
generate one or more graphical user interface (GUI) elements as a function of the set of communication group types and the type of group communication application;
configure, via the communication interface, the group communication application including the generated GUI elements at the communication device for supporting group communication associated with the user identifier, wherein the GUI elements are selected from the group consisting of notification of group communication type supported by the group communication application, view control providing a filtered list of communication groups with same group communication type, group representation to visually distinguish the communication groups based on group communication type, and interoperability control element to allow for switching between group communication applications.

11. The application server of claim 10, wherein the service capabilities of the communication group are selected from the group consisting of: voice only (V-o) capability, data only (D-o) capability, and voice and data (V+D) capability.

12. The application server of claim 11, wherein the electronic processor is configured to generate GUI elements including GUI elements that are representative of the communication groups having V+D capability and excluding GUI elements that are representative of the communication groups having D-o capability when the type indicates that the group communication application is configured for voice only communications and further when the set of communication group types includes a first set of communication groups having voice and data (V+D) capability and a second set of communication groups including data only (D-o) capability.

13. The application server of claim 11, wherein the electronic processor is configured to generate GUI elements including GUI elements that are representative of the communication groups having V+D capability and excluding GUI elements that are representative of the communication groups having V-o capability when the type indicates that the group communication application is configured for data only communications and further when the set of communication group types includes a first set of communication groups having voice and data (V+D) capability and a second set of communication groups including voice only (V-o) capability.

14. A communication device, comprising:
a communication interface;
a display; and
an electronic processor coupled to the display and communication interface, wherein the electronic processor is configured to provide, via the communication interface, a group communication application including one or more graphical user interface (GUI) elements via the display for supporting group communication associated with an user identifier,
wherein the GUI elements include GUI elements that are generated as a function of a set of communication group types and a type of group communication application, and further wherein the set of communication group types include communication group type identified for each communication group in a list of communication groups with which the user identifier is registered, and further wherein the communication group type identified for each communication group is based at least in part on service capabilities of the respective communication group, and
wherein the GUI elements are selected from the group consisting of notification of group communication type supported by the group communication application, view control providing a filtered list of communication groups with same group communication type, group representation to visually distinguish the communication groups based on group communication type, and interoperability control element to allow for switching between group communication applications.

15. The communication device of claim 14, wherein the service capabilities of the communication group is selected from the group consisting of: voice only (V-o) capability, data only (D-o) capability, and voice and data (V+D) capability.

16. The communication device of claim 14, wherein when the type of application indicates that the group communication application is configured for voice only communications and further wherein when the set of communication group types includes a first set of communication groups having voice and data (V+D) capability and a second set of communication groups includes data only (D-o) capability, the GUI elements are configured to include GUI elements that are representative of the communication groups having V+D capability and exclude GUI elements that are representative of the communication groups having D-o capability.

17. The communication device of claim 14, wherein when the type of application indicates that the group communication application is configured for data only communication and further wherein when the set of communication group types include a first set of communication groups having voice and data (V+D) capability and a second set of communication groups includes voice only (V-o) capability, the GUI elements are configured to include GUI elements that are representative of the communication groups having V+D capability and exclude GUI elements that are representative of the communication groups having V-o capability.

* * * * *